Figure 3:
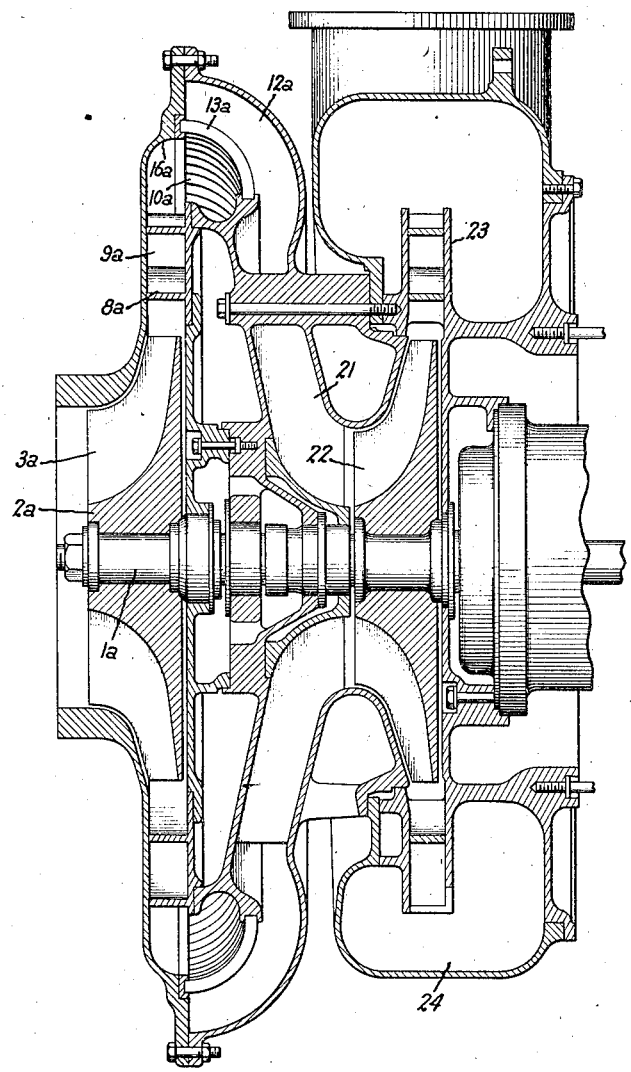

July 31, 1945.  K. D. McMAHAN  2,380,772
CENTRIFUGAL COMPRESSOR
Filed Sept. 1, 1943  2 Sheets-Sheet 1
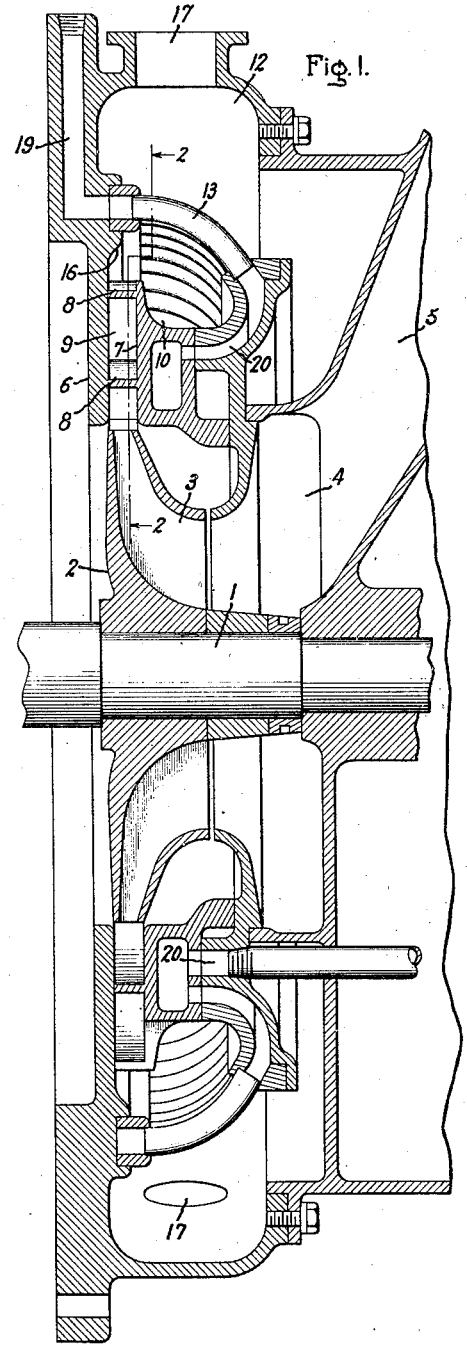
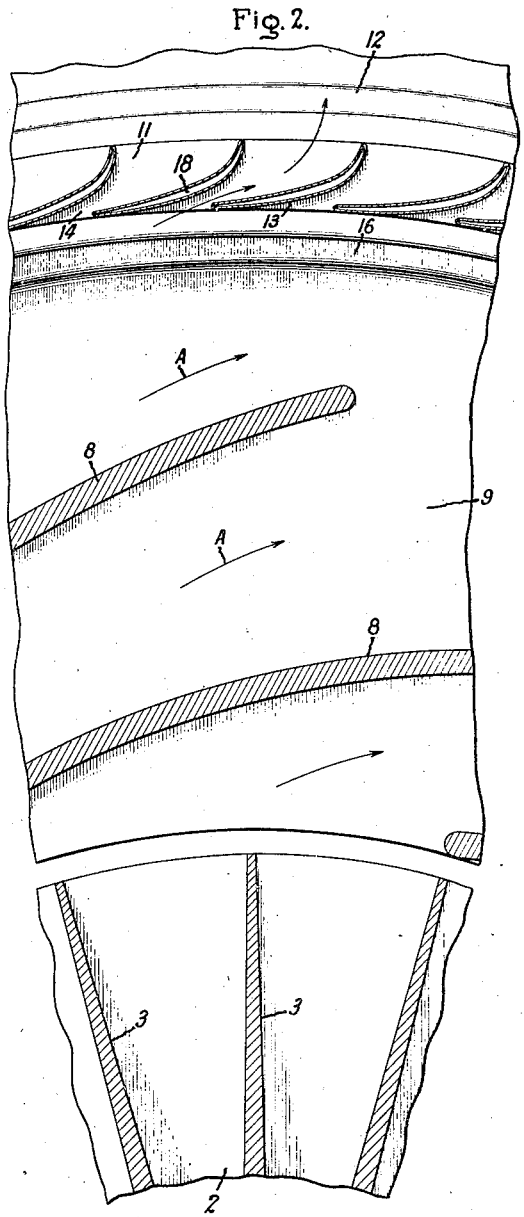
Inventor:
Kenton D. McMahan,
by Harry E. Dunham
His Attorney.

July 31, 1945.  K. D. McMAHAN  2,380,772
CENTRIFUGAL COMPRESSOR
Filed Sept. 1, 1943  2 Sheets-Sheet 2

Inventor:
Kenton D. McMahan,
by Harry E. Dunham
His Attorney.

Patented July 31, 1945

2,380,772

UNITED STATES PATENT OFFICE 2,380,772

CENTRIFUGAL COMPRESSOR

Kenton D. McMahan, Scotia, N. Y., assignor to General Electric Company, a corporation of New York Application September 1, 1943, Serial No. 500,813

2 Claims. (Cl. 230—132)

The present invention relates to centrifugal compressors. It is well adapted for incorporation in centrifugal compressors designed for use as superchargers for aircraft internal combustion engines and it is this application of my invention which I have elected to specifically illustrate and describe. It is to be understood, however, that this is only by way of example.

The object of my invention is to provide an improved construction and arrangement in a centrifugal compressor, and for a consideration of what I believe to be novel and my invention, attention is directed to the following specification and to the claims appended thereto.

In the drawings, Fig. 1 is a sectional view of a centrifugal compressor embodying my invention; Fig. 2 is a detail view on a larger scale taken on line 2—2, Fig. 1, and Fig. 3 is a view similar to Fig. 1 of another embodiment of my invention.

Referring to the drawings, Figs. 1 and 2, 1 indicates a shaft of a centrifugal compressor which may be carried in suitable bearings, not shown. Mounted on shaft 1 is the impeller 2 of the compressor, the vanes of the impeller being indicated at 3. It may be attached to the shaft in any suitable manner. Surrounding shaft 1 adjacent the inlet of the impeller are walls which define an annular chamber 4 from which air is supplied to the impeller, air being supplied to the chamber through a conduit 5. In the case of an aircraft engine, conduit 5 may connect through a pipe line with a suitable ram which faces into the slip stream of the aircraft so as to take air from the slip stream of the aircraft as is now known.

Surrounding the impeller is a diffuser comprising side walls 6 and 7 between which are located curved diffuser vanes 8 which define between them diffuser passages 9 through which air flows in the direction indicated by the arrows A. Passages 9 are shaped to convert velocity into pressure as is well understood in connection with centrifugal compressors of this type.

The construction so far described is a known one and is to be taken as typical of any suitable construction of centrifugal compressor. In the case of an aaircraft internal combustion engine, shaft 1 may be connected to the engine shaft through suitable gearing, the impeller being driven from the engine.

In operation, air is discharged by the impeller to the inlet ends of the diffuser passages and is directed by the diffuser vanes 8 through the passages to the discharge ends thereof. The air discharged from the passages has a rotational component as is indicated by the arrows A. It is discharged from the diffuser passages at relatively high velocity and flows in the form of a vortex.

According to my invention, instead of providing the usual annular scroll into which the air from the passages between the diffuser vanes 8 is discharged, I provide walls located in the region of the discharge ends of vanes 8 which define an annular vortex chamber 10, which vortex chamber is connected by an annular passage 11 to an annular discharge chamber 12, and in passage 11 I provide curved vanes 13 which define between them diffuser passages 14 the entrance ends of which face against the direction of flow in chamber 10 and through which air flows from the annular vortex chamber 10 to the annular discharge chamber 12. Annular discharge chamber 12 is defined by suitable walls which form parts of the compressor casing. The purpose of the diffuser passages 14, which form what may be termed a secondary diffuser, is to supplement the diffuser formed by the diffuser passages 9 which form what may be termed a primary diffuser, in converting velocity head into static head, and to completely stop the rotational component of velocity of the air discharged from the diffuser passages 9. In operation, the air from diffuser passages 9 is discharged into vortex chamber 10 at relatively high velocity and in a generally cirular direction. The radial inner ends of vanes 13 of the secondary diffuser catch or "pick off" the peripheral portion of the air flowing in vortex chamber 10, directing it through the diffuser passages 14 to the annular discharge chamber 12. The secondary diffuser vanes "pick off" only the high potential flow of the vortex and cause the low potential flow to return past the primary diffuser jets to be accelerated by such jets before it is "picked off" by the vanes. The air that enters the passages 14 of the secondary diffuser is further reduced in velocity and turned in a radial direction. Thus a substantial portion of the velocity head entering the vanes is recovered as pressure which would otherwise have been lost as turbulence in the casing.

It has been found that a mere lengthening of the passages of the primary diffuser beyond a fixed length reduces rather than increases the recovery of the velocity head due to boundary layer conditions. The vortex chamber 10 and the secondary diffuser vanes 13 are axially displaced, at least in part, with respect to the discharge from the primary diffuser vanes 8, there being a wall 16 which, at least in part, surrounds the primary diffuser to define a primary diffuser discharge chamber. It serves to direct air discharged from the primary diffuser axially into vortex chamber 10, thus imparting to the air an axial flow component. Air directed from the primary diffuser into vortex chamber 10 has, as pointed out above, a substantial circumferential component causing it to tend to flow circumferentially around the chamber. The resultant is flow in chamber 10 in the form of a vortex having both a circumferential and an axial component. The radially outer portion of this vortex flow, which is the high potential portion of the flow, is picked off by the secondary diffuser. The radially inner portion, which represents the lower potential flow, is caused to return past the jets of air discharging from the primary diffuser to be accelerated by such jets before it is picked off by the vanes of the secondary diffuser.

The air issuing from the secondary diffuser, its rotational component of velocity being reduced to zero, enters annular discharge chamber 12 in a generally radial direction. Leading from chamber 12 are a number of discharge openings 17 which may lead to any suitable point or points of consumption. For example, in the case of a radial type internal combustion engine, they may be connected with the several engine cylinders.

If desired, the vanes 13 of the secondary diffuser may be made hollow and a suitable coolant circulated through them for cooling the air flowing through the diffuser passages 14. Such vanes are shown in Figs. 1 and 2, the passages 18 through the vanes 13 being connected to passages 19 and 20 for circulation of coolant through them.

In Fig. 3, my invention is shown as being embodied in a two-stage centrifugal compressor, the secondary diffuser being located between the two stages. In this figure, parts corresponding to those of Figs. 1 and 2 are designated by the same reference characters with the exponent $a$ added. The air from chamber 12ª flows by way of passage 12 to the inlet of the second stage impeller 22 from which it is discharged through the second stage diffuser 23 to a discharge chamber 24.

What I claim as new and desire to secure by Letters Patent of the United States is:

1. A centrifugal compressor comprising an impeller, a primary diffuser surrounding the impeller, a wall which surrounds the discharge end of the primary diffuser to define a primary diffuser discharge chamber having an annular axially facing discharge opening, a wall which defines an annular vortex chamber axially displaced with respect to said discharge chamber and with which said axially facing discharge opening communicates for flow of gas from the primary diffuser discharge chamber to said vortex chamber whereby flow in said vortex chamber is in the form of a vortex having both a circumferential and an axial component, walls which define a discharge chamber which surrounds said vortex chamber, and secondary diffuser vanes which define diffuser passages the inlet ends of which communicate with the peripheral portion of said vortex chamber and the exit ends of which communicate with said surrounding discharge chamber whereby said vanes serve to continuously pick off the peripheral portion of the vortex flow in the vortex chamber and direct it to the discharge chamber.

2. A centrifugal compressor comprising an impeller, a primary diffuser surrounding the impeller, a wall which surrounds the discharge end of the primary diffuser to define a primary diffuser discharge chamber, walls which define a vortex chamber which is at least in part axially displaced with respect to said discharge chamber, walls which define an annular passage which connects the primary diffuser discharge chamber to the vortex chamber at one side of its center whereby gas flowing from the said discharge chamber to the vortex chamber has both an axial and a circumferential component of flow to set up flow in the vortex chamber in the form of a vortex having both a circumferential and an axial component, a discharge chamber which surrounds the vortex chamber, and a second diffuser comprising vanes which pick off the peripheral portion of the vortex flow in the vortex chamber and direct it to the discharge chamber.

KENTON D. McMAHAN.